(12) United States Patent
Kurt et al.

(10) Patent No.: US 10,204,044 B2
(45) Date of Patent: Feb. 12, 2019

(54) MEMORY MANAGEMENT PROCESS USING DATA SHEET

(71) Applicant: SAP SE, Walldorf (DE)

(72) Inventors: Burak Kurt, Istanbul (TR); Steffen Geissinger, Wiesloch (DE); Anil Akay, Istanbul (TR)

(73) Assignee: SAP SE, Walldorf (DE)

( * ) Notice: Subject to any disclaimer, the term of this patent is extended or adjusted under 35 U.S.C. 154(b) by 200 days.

(21) Appl. No.: 15/157,746

(22) Filed: May 18, 2016

(65) Prior Publication Data
US 2017/0336980 A1    Nov. 23, 2017

(51) Int. Cl.
| | | |
|---|---|---|
| *G06F 12/00* | (2006.01) | |
| *G06F 12/06* | (2006.01) | |
| *G06F 3/06* | (2006.01) | |

(52) U.S. Cl.
CPC .......... *G06F 12/0646* (2013.01); *G06F 3/064* (2013.01); *G06F 3/0608* (2013.01); *G06F 3/0656* (2013.01); *G06F 3/0673* (2013.01); *G06F 2212/1016* (2013.01); *G06F 2212/1044* (2013.01)

(58) Field of Classification Search
CPC ...... G06F 3/0605; G06F 3/064; G06F 3/0656; G06F 3/0673; G06F 12/0646; G06F 2212/1044
See application file for complete search history.

(56) References Cited

U.S. PATENT DOCUMENTS

| | | | | |
|---|---|---|---|---|
| 6,157,955 A | * | 12/2000 | Narad ..................... | H04L 45/16 709/228 |
| 6,295,234 B1 | * | 9/2001 | Schowe ............... | G06F 3/0607 365/189.12 |
| 6,704,813 B2 | * | 3/2004 | Smirnov ............... | G11B 20/10 348/E5.002 |
| 2002/0169932 A1 | * | 11/2002 | Burns ................... | G06F 3/0611 711/154 |
| 2008/0183958 A1 | * | 7/2008 | Cheriton ............ | G06F 12/0223 711/108 |
| 2012/0131025 A1 | * | 5/2012 | Cheung ............ | G06F 17/30082 707/755 |

(Continued)

OTHER PUBLICATIONS

Hildebrandt, Claudia "ZFS Readzilla and Logzilla", Oracle, https://claudidays.files.wordpress.com/2011/06/zfs_arc.pdf, Jun. 2011. (Year: 2011).*

*Primary Examiner* — Francisco A Grullon
(74) *Attorney, Agent, or Firm* — Buckley, Maschoff & Talwalkar, LLC

(57) ABSTRACT

Provided are a device and method of managing data stored in memory. The device may include a buffer for storing data blocks including a head data block, a tail data block, and intermediate data blocks. Non-used blocks may be further included in the buffer between the head data block and the tail data block. The device may further include a controller for managing the data blocks within the buffer. The managing may include determining a shift direction for the data blocks based on a distribution of the data blocks within the buffer, shifting at least one data block from among the data blocks in the determined direction, and shifting the one or more non-used blocks in an opposite direction from which the at least one data block is shifted. As a result of the shifting, the data blocks may be aggregated within the buffer.

18 Claims, 6 Drawing Sheets

(56) References Cited

U.S. PATENT DOCUMENTS

| | | | |
|---|---|---|---|
| 2012/0131286 A1* | 5/2012 | Faith | G06F 3/0613 |
| | | | 711/154 |
| 2014/0115244 A1* | 4/2014 | Maybee | G06F 12/0897 |
| | | | 711/105 |
| 2014/0115260 A1* | 4/2014 | Maybee | G06F 17/30132 |
| | | | 711/136 |
| 2014/0115261 A1* | 4/2014 | Maybee | G06F 12/0897 |
| | | | 711/136 |
| 2014/0245107 A1* | 8/2014 | Thiruvengadam | |
| | | | G06F 11/1666 |
| | | | 714/766 |
| 2014/0258244 A1* | 9/2014 | Rao | G06F 17/30159 |
| | | | 707/692 |
| 2016/0098208 A1* | 4/2016 | Willcock | G06F 3/0608 |
| | | | 711/165 |

\* cited by examiner

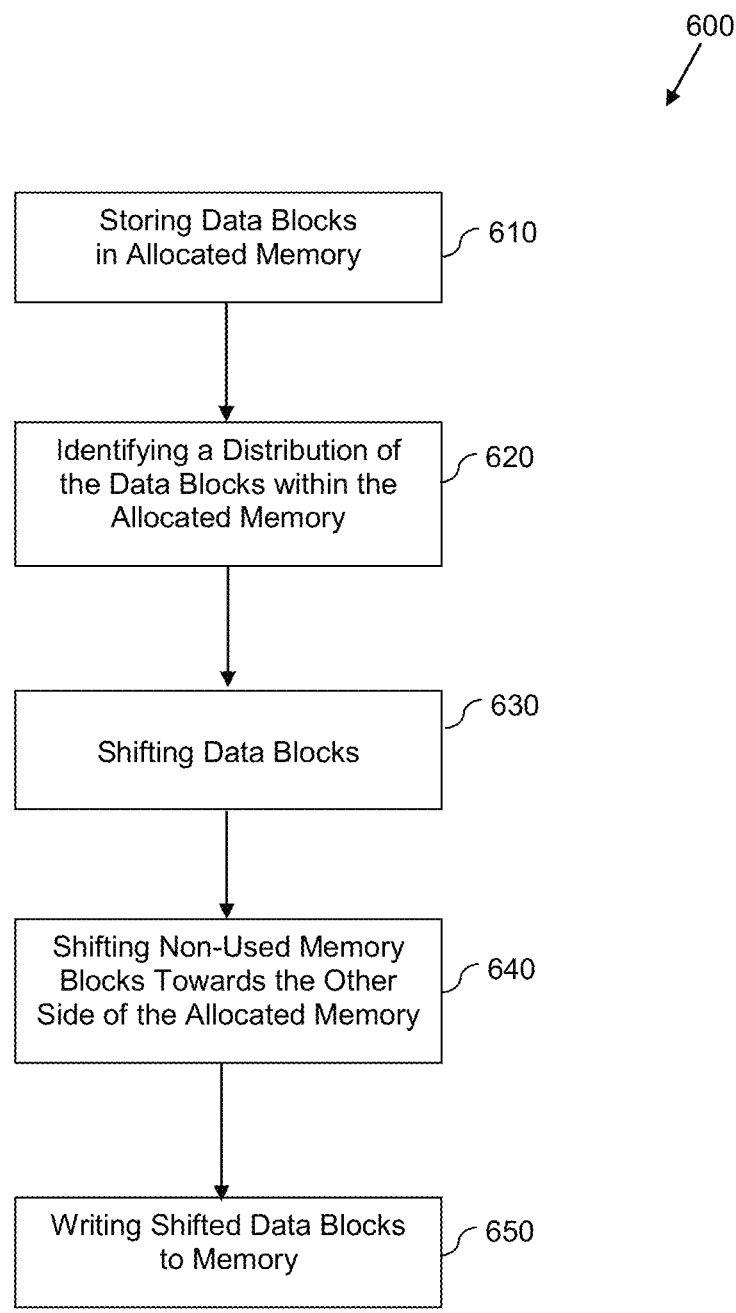

MEMORY MANAGEMENT PROCESS USING DATA SHEET

BACKGROUND

A computing system often includes one or more programs running at all times. These programs use memory allocated therefor during execution. Prior to data being stored to disk or written to disk (e.g., permanently), data is often stored in a temporary allocated memory area. Recycling memory is critical for a computing system because it provides ways to dynamically allocate memory to a program upon request and free up memory for reuse when the memory space is no longer needed or used by the program. The job of fulfilling a memory allocation request includes locating a block of unused memory having a sufficient size for the allocation request. In an operating system, memory must be allocated to programs, and reused by other programs after it is no longer required by the previous program. Here, an operating system may pretend that a computer has more memory than it actually does, and also that each program has the memory all to itself. Application memory management involves supplying the memory needed for a program from available memory resources, and recycling the memory for reuse after it is no longer needed. Application programs often cannot predict in advance how much memory they are going to require, thus creating the need for memory to be available at all times.

Memory management may be used to combat a number of issues created during the temporary storage of data. Some potential issues include programs which continually allocate memory without ever giving up the memory even though the memory is no longer needed. Eventually, these programs run out of available memory (referred to as memory leak). As an example, a memory leak may occur when an object (e.g., from object-oriented programming) is stored in memory but cannot be accessed by running code. Another problem that may arise is external fragmentation. External fragmentation occurs when free memory is separated into small blocks and is interspersed inefficiently. The result is that, although free storage is available, it is unusable because it is divided into pieces that are too small individually to satisfy the demands of the application. Another problem occurs when memory has a poor locality of reference. Successive memory accesses are faster if they are to nearby memory locations, however, if memory used by a program is placed far apart from one another, performance problems may arise. To combat some of these issues, memory managers may reuse memory by cleaning up old memory that is no longer in use by a program.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 6 is a diagram illustrating a device for managing memory in accordance with an example embodiment.

Figure 1:
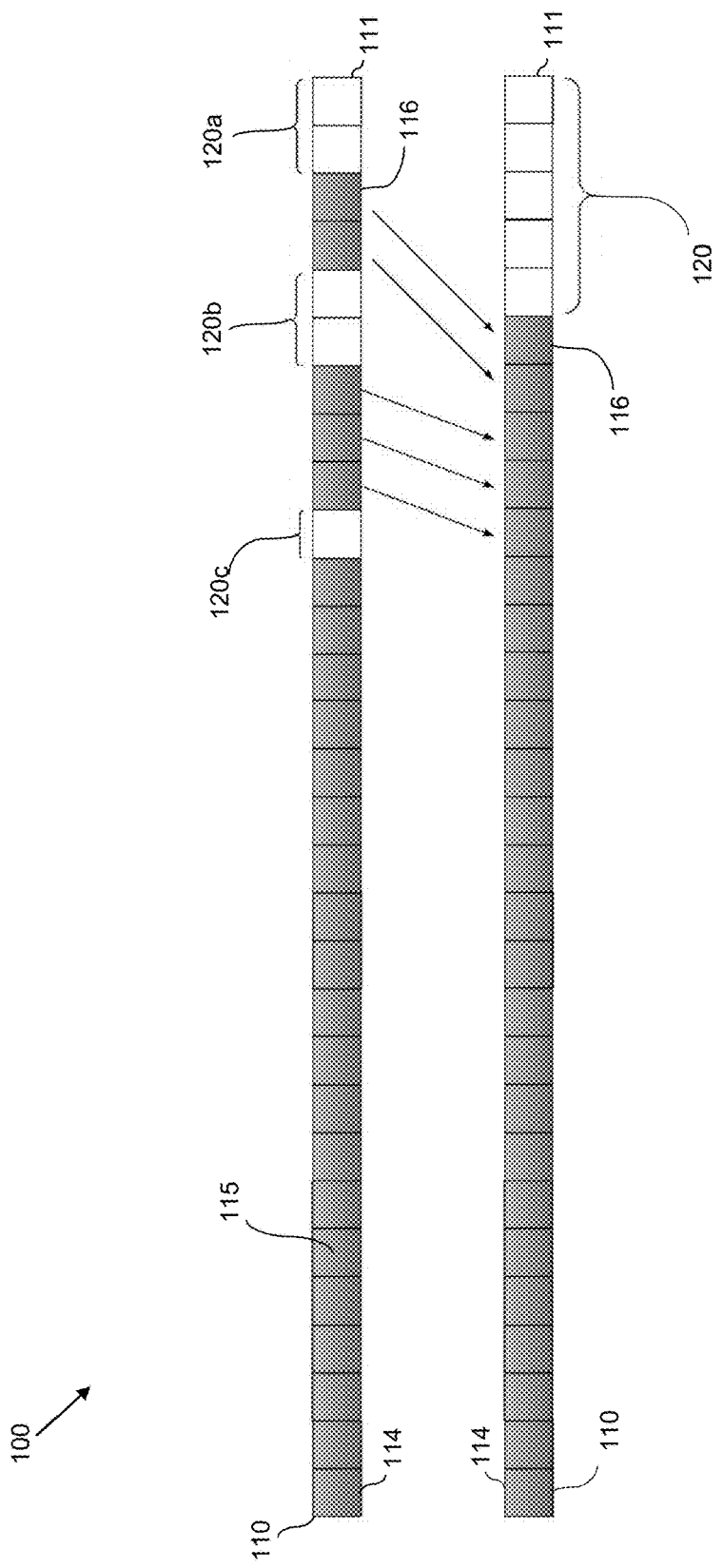
FIG. 1 is a diagram illustrating a process of managing memory by shifting data in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The examples herein are related to a memory management process in which data is shifted within allocated memory thereby aggregating blocks of the data therein. The allocated memory may include a range of memory addresses within a physical or virtual memory space of a memory device or other storage device. The data may be shifted towards a tail of the allocated memory or shifted towards a head of the allocated thereby concentrating positions of the data at the head or the tail of the allocated memory. For example, the system herein may determine whether to shift the data within the memory in a direction towards the head or the tail thereof based on a distribution of the data within the memory. For example, if data is heavier (i.e., has a greater distribution) towards the tail of the memory, the system may determine to shift the data in a direction towards the tail. As another example, if data is heavier towards the head of the memory, the data may be shifted in a direction towards the head. The result of the shifting may create an aggregated string of data blocks at one end or towards one end of the allocated memory and an aggregated string of non-used blocks on the other end of the allocate memory. When the data blocks are written from the allocated memory to a disk or other medium, the aggregated string of data may be written continuously without any of the garbage data blocks being written as a result of the shifting operation. Furthermore, by being able to shift the data blocks towards either of the tail or the head of the memory, a shift direction causing the list amount of data shifting can be determined, thereby reducing the number of actions taken by the memory and improving the overall efficiency of the data aggregation.

The memory management method may be used along with a data compression method, and the like. Compression of a data chunk in an allocated memory results in non-used memory areas or non-used blocks. For example, the non-used memory areas may be garbage areas, empty areas, and the like. Before writing the data to disk, it is paramount to eliminate these non-used memory areas. One common method to eliminate this garbage memory is to allocate a new smaller memory and to copy the data to the new memory without copying the non-used memory areas. However, this operation is quite costly as it requires a new memory allocation, copying, and freeing the previous memory. The examples herein provide a technique which doesn't require a new memory allocation and also prevents memory leak by keeping a pointer to the head of the allocated memory. To improve the time performance of the memory shift, either the data can be leaned towards the head or towards the tail. As one example, if the tail area of the allocated memory is heavier, that is, more of the data is on a right side of the allocated memory, shifting may be performed towards the tail of the allocated memory to reduce total amount of shifting that needs to be performed. Furthermore, an operating system may only identify an allocated memory space if it is given a location of a head of the allocated memory space. For this reason, after the leaning towards right, a location of the head of the allocated memory may be identified using the garbage area next to a head of the data.

Figure 2:
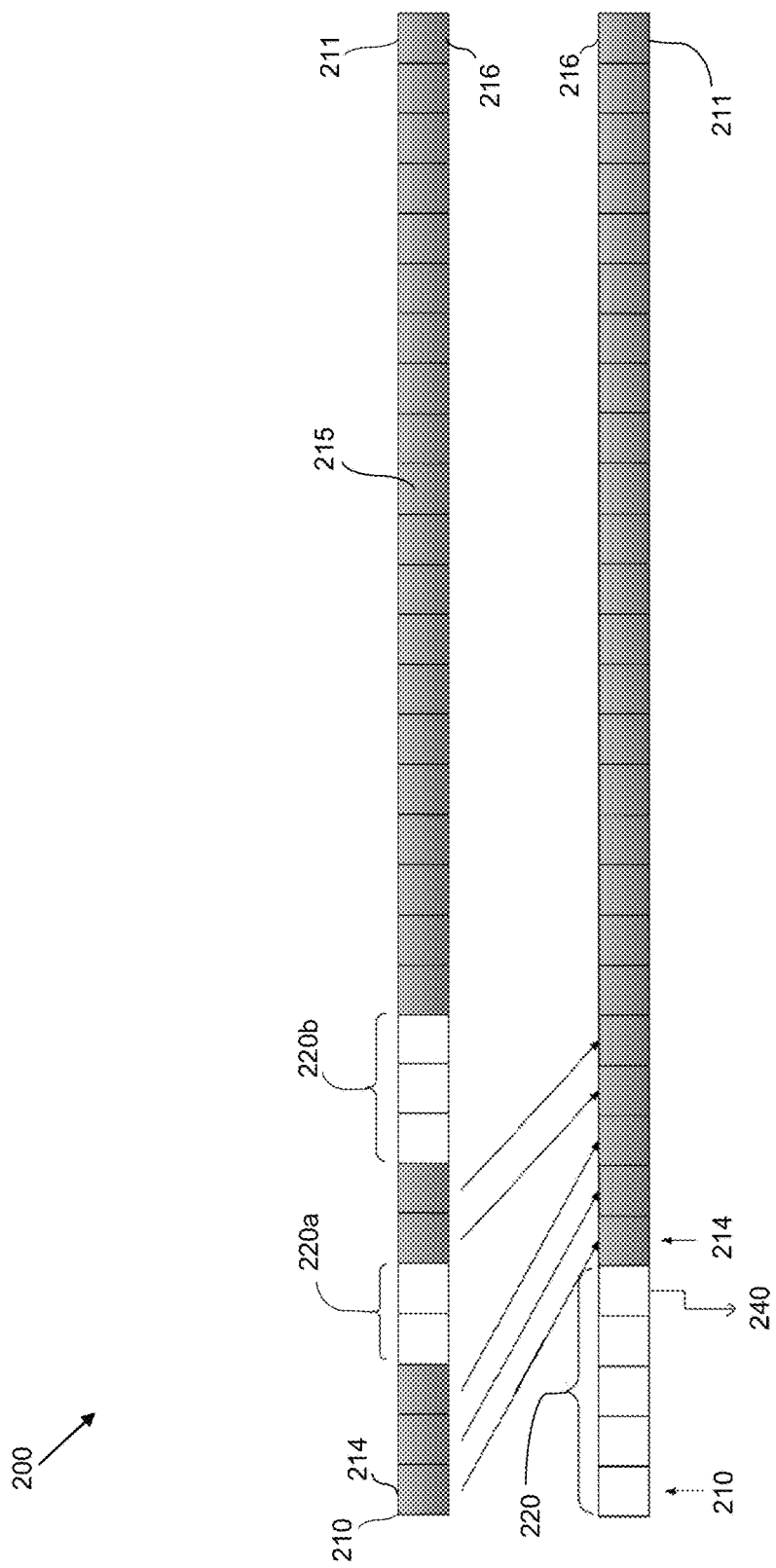
FIG. 2 is a diagram illustrating a process of managing memory by shifting data in accordance with another example embodiment.

FIG. 1 illustrates a process of managing memory by shifting data in accordance with an example embodiment and FIG. 2 illustrates a process of managing memory by shifting data in accordance with another example embodiment. In these examples, memory blocks are allocated in one-dimensional buffers or arrays of memory, however the examples herein are not-limited thereto, and the allocated memory may have a different amount of dimension such as two-dimensions or three-dimensions.

Referring to FIG. 1, in the top example allocated memory block 100 is shown prior to a shift operation and in the bottom example allocated memory block 100 is shown after the shift operation. The allocated memory block 100 may also be referred to as a buffer 100. The buffer 100 includes a head 110 and a tail 111. Stored within the buffer 100 is a head block 114 of data, a tail block 116 of data, and a plurality of intermediate data blocks 115 of data. In this example, the head block 114 is located at a position of the head 110 of the buffer 100. For example, the head of the data and the head 110 of the buffer 100 may be located at the same address in the buffer 100. However, in this example the tail block 116 is not located at the same location as a position of the tail 111 of the buffer 100. Instead, non-used memory areas 120a are located between the tail block 115 and the tail 111 of the buffer 100. Furthermore, non-used memory areas 120b and 120c along with the plurality of intermediate data blocks 115 are located between the head block 114 and the tail block 116. The non-used memory areas 120a, 120b, and 120c may result from memory that was previously used but the data stored therein is no longer needed. As another example, the non-used areas 120a, 120b, and 120c may result from compression of data included one or more of the head block 114, the intermediate data blocks 115, and the tail block 116.

According to various aspects, a distribution of the data including the head block 114, the intermediate blocks 115, and the tail block 116 may be analyzed to determine whether data is heavier towards the head 110 of the buffer 100 or towards the tail 111 of the buffer 100. For example, the amount of data included in the left-half of the buffer 100 and the amount of data included in the right-half of the buffer 100 may be compared with one another to determine which half has more data. The half with more data may be referred to as the half of the buffer 100 having more weight or the side of the buffer that is heavier. In the example of FIG. 1, the left half of the buffer 100 is completely filled with data blocks while the right half of the buffer 100 has five non-used blocks 120a, 120b, and 120c. As a result, the data is heavier towards the head 110 of the buffer 100. Accordingly, in this case some of the data blocks are shifted (i.e., leaned) towards the head 110 and the non-used blocks 120b and 120c are shifted towards the tail 111 of the buffer 100. As a result, all of the data blocks are aggregated at the head 110 of the buffer 100 and all of the non-used blocks 120 are aggregated at the tail 111 of the buffer 100. That is, the data blocks are contiguously disposed within the buffer 100 in an unbroken sequence of data without any non-used blocks breaking the sequence.

In this example, the head data block 114 and the head 110 of the buffer 100 are the same. Therefore, when the data blocks are shifted towards the head 110 the head data block 114 is already at a position of the head 110 and therefore does not shift. Furthermore, a number of the intermediate blocks 115 are also aggregated contiguously next to the head data block 114 and cannot move any closer to the head 110 of the buffer 100. However, the intermediate data blocks 115 between the non-used memory 120b and 120c and the intermediate data blocks 115 between the non-used memory 120a and 120b, may be shifted towards the left to occupy spaces previously occupied by the non-used memory 120b and 120c. As a result of the shift in this case, all of the data blocks (114, 115, and 116) are aggregated together within the buffer 100 and all of the non-used memory blocks 120 (i.e., 120a, 120b, and 120c) are aggregated together within the buffer 100.

As described in the examples herein, shifting of data blocks refers to the shifting of at least one data block from among the plurality of data blocks and may include all of the data blocks, some of the data blocks, or only one of the data blocks. The shifting pushes data towards one side of the buffer 100 while pushing the non-used blocks towards the other side of the buffer 100. Accordingly, when a memory controller, processor, or the like collects the data for retrieval, writing to disk, or the like, the data is located in one continuous string without interruptions from the non-used blocks.

Referring to FIG. 2, allocated memory block 200 is shown prior to a shift operation in the top example of FIG. 2 and after a shift operation in the bottom example of FIG. 2. The allocated memory block or buffer 200 includes a head 210 and a tail 211. Stored within the buffer 200 is a head block 214 of data, a tail block 216 of data, and a plurality of intermediate blocks 215 of data. In this example, the head block 214 is located at a position of the head 210 of the buffer 200. That is, the head of data and the head 210 of the buffer 200 are located at the same address in the buffer 200. Also, the tail block 216 is located at the same location as a position of the tail 211 of the buffer 200. However, in this example, there are a number of non-used memory areas 220a and 220b that are distributed near the head 210 of the buffer 200 rather than the tail as shown in FIG. 1.

According to various aspects, a distribution of the data including the head block 214, the intermediate blocks 215, and the data block 216 may be analyzed to determine whether data is heavier towards the head 210 of the buffer 200 or towards the tail 211 of the buffer 200. In the example of FIG. 2, the right half of the buffer 200 is completely filled with data blocks while the left half of the buffer 200 has five non-used blocks 220a and 220b. That is, the data is heavier towards the tail 211 of the buffer 200. Accordingly, in this case some of the data blocks are shifted towards the tail 211 and the non-used memory blocks 220a and 220b are shifted towards the head 210 of the buffer 200. As a result, all of the data blocks are aggregated at the tail 211 of the buffer 200 and all of the non-used memory blocks 220 are aggregated at the head 210 of the buffer 200.

In this example, the head block 214 and the head 210 of the buffer 200 are located at the same position. However, when the data blocks are shifted towards the tail 211 the head data block 214 moves from the head 210 of the buffer 220 in a direction towards the tail 211 until all of the data blocks are contiguously aggregated within the buffer 200 with the string of data blocks ending at the tail 211. In this example, the tail block 216 is already positioned at the tail 211 of the buffer 200. Therefore, the tail block 216 does not move as a result of the shift. Furthermore, a number of the intermediate blocks 215 are also contiguously aggregated next to the tail block 216 and cannot be moved any closer to the tail 211 of the buffer 200. However, intermediate blocks 215 between the non-used areas 220b and 220a and the intermediate blocks 215 between the non-used area 220b and the head 210 of the buffer 200, may be shifted towards the right to occupy spaces previously occupied by the non-used blocks 220b and 220a. As a result of the shift in this case, all of the data blocks (214, 215, and 216) are aggregated together within the buffer 200 and all of the non-used memory blocks 220 (i.e., 220a and 220b) are aggregated together within the buffer 200.

After data has been shifted as shown in the examples of FIG. 1 and FIG. 2, the data may be written to a storage medium. If data is written prior to being shifted, the operating system would collect all of the data from the allocated memory including the non-used memory areas and write them to the storage medium. However, in the examples herein, the aggregated data may only be written to the storage medium and the aggregated non-used memory may be excluded. As used herein, storage medium may refer to any kind of memory, for example, random access memory (RAM), read-only memory (ROM), volatile memory, non-volatile memory, hybrid memory, multiple memories, flash memory, main memory, CPU, disk, and the like.

Figure 3:
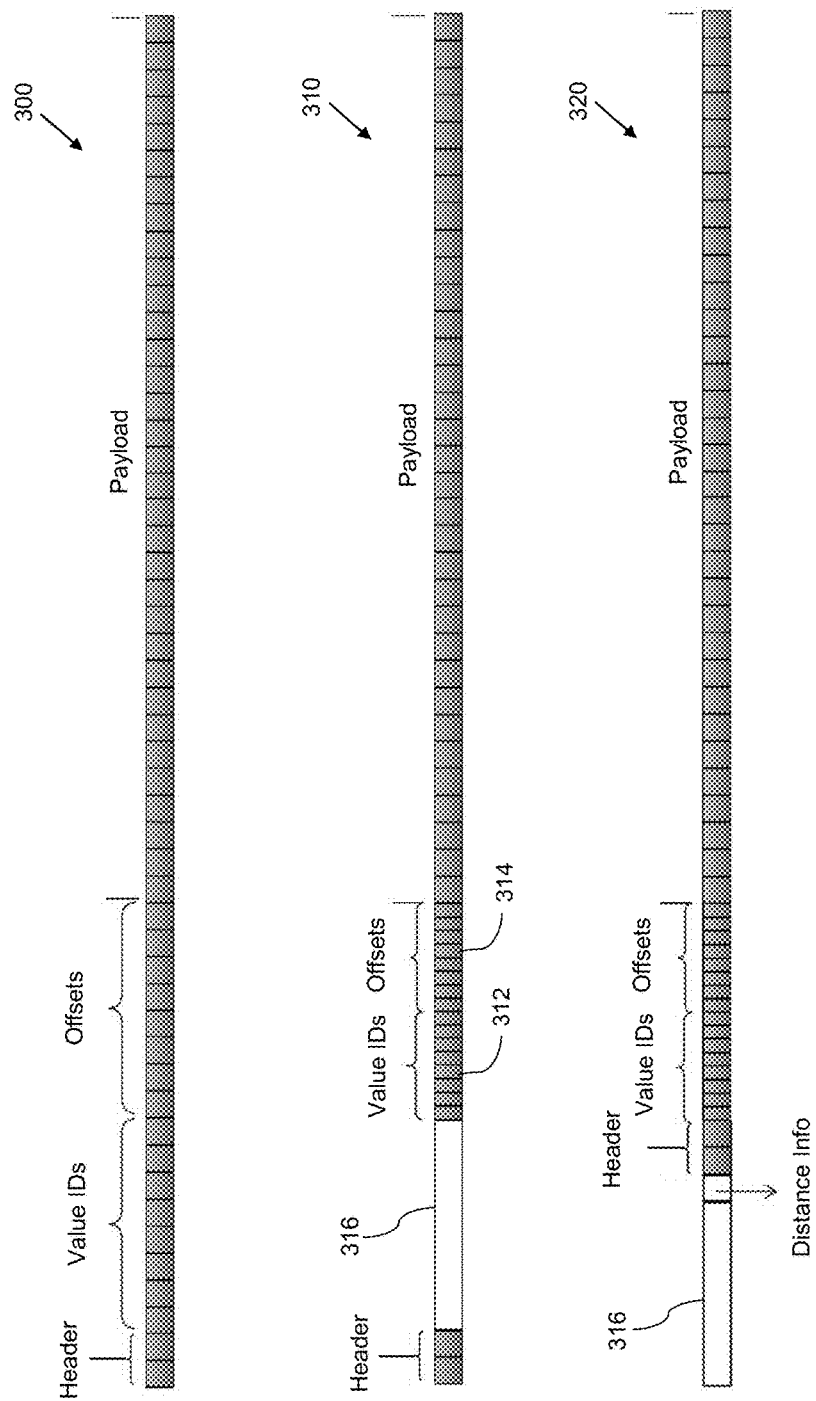
FIG. 3 is a diagram illustrating a compression operation in accordance with an example embodiment.

FIG. 3 illustrates a compression operation in accordance with an example embodiment. Referring to FIG. 3, a buffer is shown storing a plurality of objects which may be represented by, for example, a JavaScript Object Notation (JSON), an encoded data object notation, a binary object notation, and the like. Buffer 300 illustrates the data prior to a compression operation being performed. In this example, the objects include a header object including 2 blocks of data, a value IDs object including 8 blocks of data, an offsets object including 8 blocks of data, and a payload object including multiple blocks of data. For example, the header section may include information about the objects such as offset size, size of the overall object, and the like. Value IDs may be unique corresponding values of keys from a dictionary. Offsets may provide the location of the desired element within the object. For example, the $k^{th}$ value-ID may have its offset information in the $k^{th}$ offset in the offsets section. The size of the blocks may be constructed initially such that the value IDs have sizes of 4 bytes, offsets have sizes of 4 bytes, payload data blocks have sizes of 4 bytes, and the like, to be able to accommodate large values. However, it should also be appreciated that the value IDs, offsets, and payload blocks may have a different size than 4 bytes, and may be different in size with respect to one another. Also, one or more of the value IDs, the offsets, and the payload may be omitted, and/or other object may be included in the buffer. Furthermore, it should be understood that the various data types shown in FIG. 3 are merely for purposes of example and are not meant to limit the type of data which may be included in or otherwise stored in the buffer 300 and shifted according to example embodiments.

Buffer 310 includes data blocks therein after a compression operation. In this example, a size of the data included in the blocks for the value IDs and the offsets may be compressed resulting in compressed value ID data 312 and compressed offset data 314 within the memory. As one example, value IDs having a size of 4 bytes may be compressed into data blocks having a size of 1 byte, 2 bytes, 3 bytes, or the like. The compressed size may be determined by the largest value id in the object. For example, a max size value ID may be tracked during an object building phase, and may be updated if the ID of the key of the appended element in the object is larger than the existing maximum. Likewise, a size of the offsets may also be compressed. The compressed size may be determined by the largest offset value in the object which is the last offset. The size of the value IDs and the size of the offsets may be stored within the header section of the data included in the buffer 310. In this case, the compression of the data results in a non-used memory area 316. For example, the non-used memory area 316 may be garbage memory, empty memory, and the like.

For data storage and data retrieval to be more efficient, the non-used memory areas 316 may be separated from the data within the buffer such that the data is aggregated together in one contiguous string within the allocated memory (e.g., buffer) and the non-used memory areas 316 are aggregated together in another contiguous string within the allocated memory. Also, to prevent a memory leak from occuring, a location of the head of the buffer may be maintained for the operating system, even if the head of the data is moved away from the head of the buffer. Buffer 320 illustrates an example of the data after it has been shifted towards the tail of the object. In this case, the header, the value IDs, the offsets, and the payload are aggregated together and stored at the tail end of the buffer and the non-used memory areas 316 are aggregated together and stored at the head end of the buffer. A determination to shift the data towards the tail of the buffer may be based on the data distribution within the buffer, which in this example is heavier towards the tail.

An operating system may only identify allocated memory if it is provided the head of the buffer. In this example, the head of the buffer no longer includes the head of data and thus it may be unclear where the head of the buffer begins and where the head of the data begins. However, a position of the head of the buffer may be maintained based on a distance between the head of the data and the non-used memory areas (e.g., head of buffer=head of data+non-used memory). Accordingly, the operating system may detect a location of a head of the buffer and a head of the data based on information stored in the head of the data rather than the head of the buffer.

Figure 4:
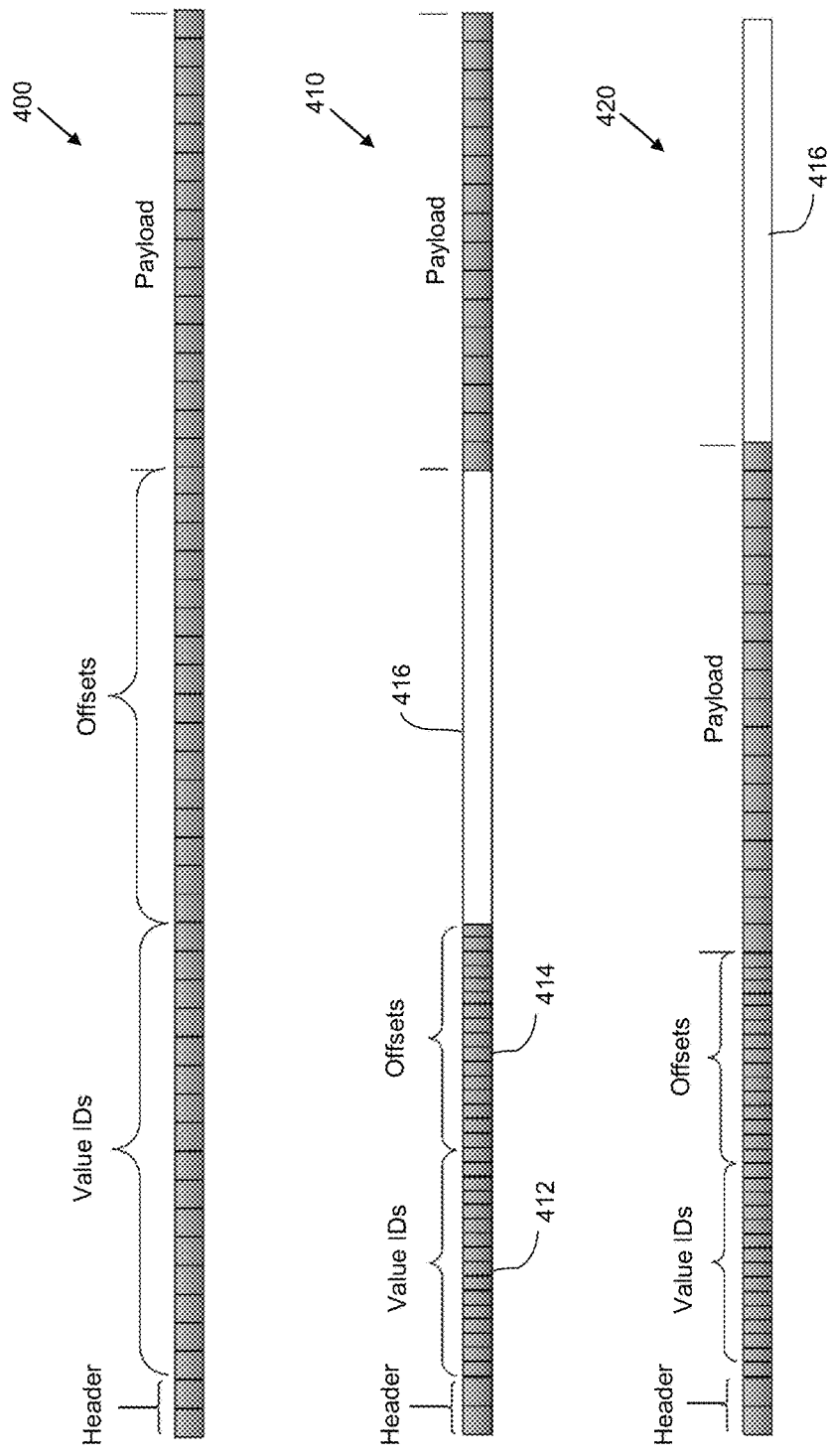
FIG. 4 is a diagram illustrating a compression operation in accordance with another example embodiment.

FIG. 4 is a diagram illustrating a compression operation in accordance with another example embodiment. In the example of FIG. 4, the compressed data is shifted towards the head of the buffer. Referring to FIG. 4, a buffer 400 illustrates the data prior to a compression operation being performed. Similar to FIG. 3, the objects include a header object including 2 blocks of data, a value IDs object including 16 blocks of data, an offsets object including 16 blocks of data, and a payload object including multiple blocks of data. For example, the size of the blocks may be constructed initially such that the value IDs have sizes of 4 bytes, offsets have sizes of 4 bytes, payload data blocks have sizes of 4 bytes, and the like, to be able to accommodate large values. However, it should also be appreciated that the value IDs, offsets, and payload blocks may have a different size than 4 bytes, and may be different in size with respect to one another. Also, one or more of the value IDs, the offsets, and the payload may be omitted, and/or other object may be included in the buffer.

Buffer 410 includes data blocks therein after a compression operation. In this example, a size of the data included in the blocks for the value IDs and the offsets may be compressed resulting in compressed value ID data 412 and compressed offset data 414 within the memory. In this case, the compression of the data results in a non-used memory area 416. For example, the non-used memory area 416 may be garbage memory, empty memory, and the like. The non-used memory areas 416 may be separated from the data within the buffer such that the data is aggregated together in one contiguous string within the allocated memory (e.g., buffer) and the non-used memory areas 416 are aggregated together in another contiguous string within the allocated memory object. Buffer 420 illustrates an example of the data after it has been shifted towards the head of the object. In this case, the header, the value IDs, the offsets, and the payload are aggregated together at the head end of the buffer and the non-used memory areas 416 are aggregated at the tail end of the buffer. A determination to shift the data towards the head of the buffer may be based on the data distribution within the buffer, which in this example is heavier towards the head.

Figure 5:
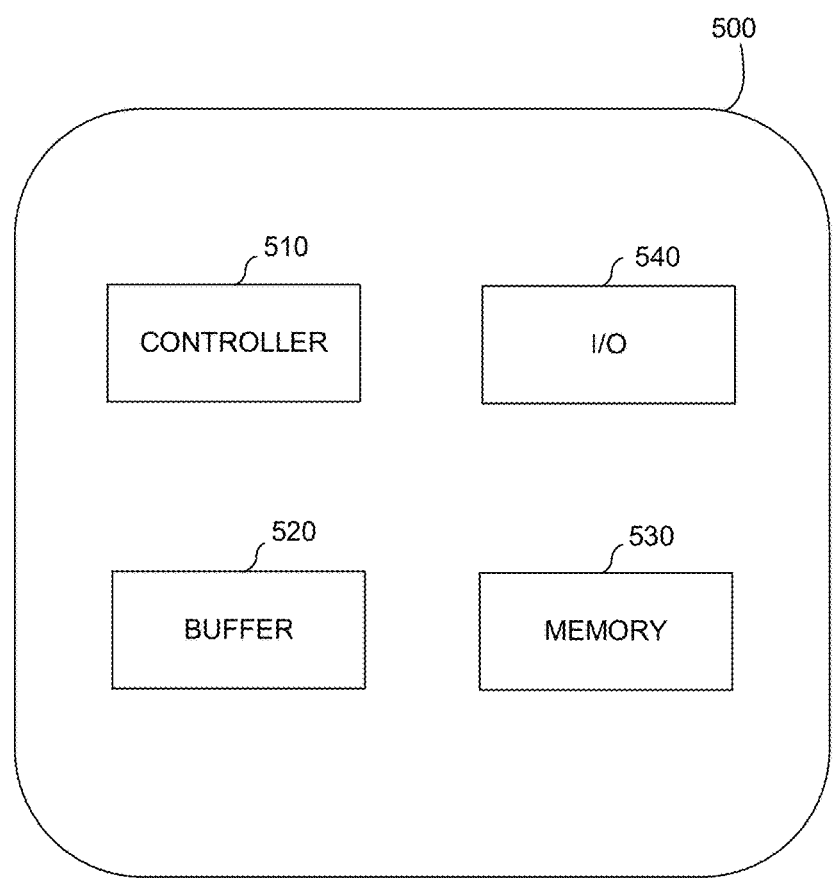
FIG. 5 is a diagram illustrating a method of managing memory by shifting data in accordance with an example embodiment.

FIG. 5 illustrates a device 500 for managing memory in accordance with an example embodiment. The device 500 may be included in a device used for storage of data such as a memory device, a computer, a desktop computer, a laptop computer, a notebook, a tablet, a mobile phone, a smart wearable device, a phablet, a television, an appliance, a kiosk, and the like. Referring to FIG. 5, the device 500 includes a controller 510, a buffer 520, a memory 530, and an input/output unit 540. It should be appreciated that the buffer 520 and the memory 530 may be the same element, but they are illustrated here separately for convenience of explanation. In this example, the controller 510 may control the overall operations of the storage device 500. For example, the controller 510 may be a memory controller, a memory manager, a processor, and the like. The input/output unit 540 may receive data and may transmit the data to the buffer 520 and/or the memory 530. Also, the input/output unit 540 may output data from the buffer 520 and/or the memory 530 to another element or device.

In this example, the buffer 520 stores data blocks including a head data block, a tail data block, and intermediate data blocks included between the head data block and the tail data block. In addition to usable data, one or more non-used memory blocks may be further included in the buffer between the head data block and the tail data block. For example, the non-used memory blocks may be located before the head data block, after the tail data block, and/or interspersed with the intermediate data blocks between the head data block and the tail data block. Examples of the buffer 520 are shown in the examples of FIGS. 1-4. The controller 510 may manage the data blocks and the non-used memory blocks within the buffer 520. For example, the controller 510 may determine to shift data blocks towards a tail of the buffer 520 or the head of the buffer 520 based on a distribution of the data within the buffer 520. The controller 510 may also perform the shifting of at least one data block from among the data blocks in the determined direction, and the shifting the of one or more non-used memory blocks in an opposite direction in which the at least one data block is shifted.

As a result of the shifting of the at least one data block and the shifting of the one or more non-used memory blocks by the controller 510, all of the data blocks within the buffer 520 may be aggregated together at a first side of the buffer 520 and all of the non-used memory blocks within the buffer 520 may be aggregated together at a second side of the buffer 520 that is opposite to the first side of the buffer 520. When determining which direction to shift the data blocks within the buffer 520, the controller may determine to shift the data blocks in a direction towards a head of the buffer 520 in response to a greater number of the data blocks being distributed closer to the head of the buffer 520 in comparison to a tail of the buffer 520, and determine to shift the data blocks in a direction towards the tail of the buffer 520 in response to a greater number of the data blocks being distributed closer to the tail of the buffer 520 in comparison to the head of the buffer 520. The shifting of the at least one data block may include shifting the head data block in a direction towards a tail of the buffer. Here, and the controller 510 may store a location of the head data block with respect to the head of the buffer either in the memory 530, or in another storage area not shown. Accordingly, when the operating system attempts to write the data from the buffer into the memory 530, or output the data through the input/output unit 540, the operating system may recognize where the head of the buffer is and also where the beginning of the data occurs.

FIG. 6 illustrates a method 600 for managing memory by shifting data in accordance with an example embodiment. For example, the method 600 may be performed by a storage device shown in FIG. 5 or another device. Referring to FIG. 6, in 610 the method includes storing data blocks in an allocated memory such as a data buffer. For example, the data blocks may include a head data block, a tail data block, and intermediate data blocks included between the head data block and the tail data block. Also, one or more non-used memory blocks may be are further included in the allocated memory between the head data block and the tail data block. In 620, the data distribution within the allocated memory is analyzed and a side of the allocated memory having the most data is identified.

The method 600 further includes managing the data blocks within the buffer. In this case, the managing includes identifying a distribution of the data blocks within the buffer determined in 620. In 630, the method includes shifting at least one data block from among the data blocks in a direction of the buffer based on the data distribution determined in 620. For example, the data may be shifted towards a side of the buffer having the most data contained therein, thus reducing the amount of data shifting need to shift all data within the buffer to an aggregate end. In 640, the method also includes shifting the one or more non-used memory blocks in an opposite direction in which the at least one data block is shifted. For example, the data blocks may be shifted towards the tail of the buffer and the non-used memory blocks may be shifted towards the head of the buffer. While 630 and 640 are shown as separate operations in FIG. 6, it should be appreciated that the steps in 630 and 640 may be performed simultaneously. As a result of the shifting in 630 and 640, all of the data blocks may be aggregated together at a first side of the buffer and all of the non-used memory blocks may be aggregated together at a second side of the buffer that is opposite to the first side of the buffer. In 650, the data blocks which have been aggregated are written to memory, for example, a storage disk, medium, or the like.

According to various example embodiments, described herein is a system and method for aggregating blocks of data within an allocated memory. Based on the distribution of the data within the allocated memory, data may be shifted towards a tail of the allocated memory or shifted towards a head of the allocated to concentrate the positions of the storage of data within the allocated memory. By enabling data to be shifted either to the tail or the head of the allocated memory, instead of only shifting data to the same side every time, an amount of data shifting may be reduced by leaning the data towards the data-heaviest side within the allocated memory. As a result, less memory resources may be required to perform the data shift and the overall efficiency of the memory may be improved.

Also, there may be a situation in which the distribution of data blocks within the allocated memory is the same towards the head end and the tail end of the allocated memory. In this case, the system may determine to shift the data blocks within the allocated memory towards either the head or the tail such that all of the data blocks are aggregated at the head or the tail of the buffer and all of the non-used memory blocks are aggregated at the other end of the buffer.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the invention as set forth in the appended claims.

What is claimed is:

1. A storage device comprising:
   a buffer for storing data blocks including a head data block, a tail data block, and intermediate data blocks included between the head data block and the tail data block, wherein one or more non-used blocks are further included in the buffer between the head data block and the tail data block; and
   a controller for managing the data blocks within the buffer, the managing comprising determining whether to shift the data blocks in a direction towards a head of the buffer or a tail of the buffer based on a location of the one or more non-used blocks with respect to the head and the tail of the buffer, shifting at least one data block from among the data blocks in the determined direction, and shifting the one or more non-used blocks in an opposite direction from which the at least one data block is shifted.

2. The storage device of claim 1, wherein the shifting of the at least one data block and the shifting of the one or more non-used blocks results in all of the data blocks being aggregated together at a first side of the buffer and all of the non-used blocks being aggregated together at a second side of the buffer that is opposite to the first side of the buffer.

3. The storage device of claim 1, wherein the determining the shift direction comprises:
   determining to shift the data blocks in a direction towards the head of the buffer in response to a greater number of the one or more non-used data blocks being distributed closer to the tail of the buffer in comparison to the head of the buffer, and
   determining to shift the data blocks in a direction towards the tail of the buffer in response to a greater number of the one or more non-used data blocks being distributed closer to the head of the buffer in comparison to the tail of the buffer.

4. The storage device of claim 1, wherein the shifting the at least one data block comprises shifting the head data block in a direction towards the tail of the buffer, and the controller further stores a location of the head data block with respect to the head of the buffer.

5. The storage device of claim 4, wherein the controller further writes the data blocks from the buffer to a storage medium after the head data block is shifted, based on the stored location of the head data block with respect to the head of the buffer.

6. The storage device of claim 1, wherein the one or more non-used blocks comprise garbage data blocks that are generated by a compression operation on data included in the data blocks.

7. The storage device of claim 1, wherein the buffer comprises a one-dimensional buffer of memory for temporarily storing the data blocks before they are written to a storage medium.

8. The storage device of claim 1, wherein the buffer comprises an allocated memory area for use by a program running on a computer.

9. A method for managing data, the method comprising:
   storing data blocks in a buffer, the data blocks including a head data block, a tail data block, and intermediate data blocks included between the head data block and the tail data block, wherein one or more non-used blocks are further included in the buffer between the head data block and the tail data block; and managing the data blocks within the buffer, the managing comprising determining whether to shift the data blocks in a direction towards a head of the buffer or a tail of the buffer based on a location of the one or more non-used data blocks with respect to the head and the tail of the buffer, shifting at least one data block from among the data blocks in the determined direction, and shifting the one or more non-used blocks in an opposite direction from which the at least one data block is shifted.

10. The method of claim 9, wherein the shifting of the at least one data block and the shifting of the one or more non-used blocks results in all of the data blocks being aggregated together at a first side of the buffer and all of the non-used blocks being aggregated together at a second side of the buffer that is opposite to the first side of the buffer.

11. The method of claim 9, wherein the determining the shift direction comprises:

determining to shift the data blocks in a direction towards the head of the buffer in response to a greater number of the one or more non-used data blocks being distributed closer to the tail of the buffer in comparison to the head of the buffer, and determining to shift the data blocks in a direction towards the tail of the buffer in response to a greater number of the one or more non-used data blocks being distributed closer to the head of the buffer in comparison to the tail of the buffer.

12. The method of claim 9, wherein the shifting the at least one data block comprises shifting the head data block in a direction towards the tail of the buffer, and storing a location of the head data block with respect to the head of the buffer.

13. The storage device of claim 12, wherein the controller further writes the data blocks from the buffer to a storage medium after the head data block is shifted, based on the stored location of the head data block with respect to the head of the buffer.

14. The method of claim 9, wherein the one or more non-used blocks are generated by a compression of data included in the data blocks.

15. The method of claim 9, wherein the buffer comprises a one-dimensional buffer of memory for temporarily storing the data blocks before they are written to a storage medium.

16. The method of claim 9, wherein the buffer comprises an allocated memory area for use by a program running on a computer.

17. A non-transitory computer readable medium having stored therein instructions that when executed cause a computer to perform a method for managing data, the method comprising:

storing data blocks in a buffer, the data blocks including a head data block, a tail data block, and intermediate data blocks included between the head data block and the tail data block, wherein one or more non-used blocks are further included in the buffer between the head data block and the tail data block; and managing the data blocks within the buffer, the managing comprising determining whether to shift the data blocks in a direction towards a head of the buffer or a tail of the buffer based on a location of the one or more non-used data blocks with respect to the head and the tail of the buffer, shifting at least one data block from among the data blocks in the determined direction, and shifting the one or more non-used blocks in an opposite direction from which the at least one data block is shifted.

18. The non-transitory computer readable medium of claim 17, wherein the shifting of the at least one data block and the shifting of the one or more non-used blocks results in all of the data blocks being aggregated together at a first side of the buffer and all of the non-used blocks being aggregated together at a second side of the buffer that is opposite to the first side of the buffer.

* * * * *